US007824921B1

(12) United States Patent
Levy

(10) Patent No.: US 7,824,921 B1
(45) Date of Patent: Nov. 2, 2010

(54) SELF RESEALING ELASTOMERIC CLOSURE

(76) Inventor: Abner Levy, 325 N. Oakhurst Dr., P4, Beverly Hills, CA (US) 90210

( * ) Notice: Subject to any disclaimer, the term of this patent is extended or adjusted under 35 U.S.C. 154(b) by 1105 days.

(21) Appl. No.: 10/873,554

(22) Filed: Jun. 21, 2004

Related U.S. Application Data

(63) Continuation of application No. 10/059,998, filed on Jan. 28, 2002, now Pat. No. 6,752,965, which is a continuation-in-part of application No. 09/396,708, filed on Sep. 15, 1999, now Pat. No. 6,361,744, which is a continuation-in-part of application No. 09/036,578, filed on Mar. 6, 1998, now Pat. No. 6,030,582.

(51) Int. Cl.
*G01N 1/10* (2006.01)
*B65D 41/20* (2006.01)

(52) U.S. Cl. ......................... 436/180; 422/99; 422/100; 422/102; 600/573; 600/577; 215/247; 215/296; 215/303; 215/349; 215/350

(58) Field of Classification Search ................... 422/99, 422/100, 102; 436/180; 600/573, 577; 215/232, 215/247, 249, 296, 297, 299, 303, 349, 350
See application file for complete search history.

(56) References Cited

U.S. PATENT DOCUMENTS 2,436,291 A * 2/1948 Daniel ..................... 15/257.05
3,629,873 A * 12/1971 Long ............................ 4/220
4,515,752 A * 5/1985 Miramanda .................. 422/99
4,868,130 A * 9/1989 Hargreaves ................. 436/526
5,202,093 A * 4/1993 Cloyd ......................... 422/102
5,257,984 A * 11/1993 Kelley ........................ 604/403
5,334,349 A * 8/1994 Kelln et al. ................... 422/63
6,017,317 A * 1/2000 Newby et al. ............... 600/573
6,030,582 A * 2/2000 Levy ........................... 422/99
6,054,099 A * 4/2000 Levy .......................... 422/102
6,361,744 B1 * 3/2002 Levy ........................... 422/99
6,752,965 B2 * 6/2004 Levy ........................... 422/99

* cited by examiner

*Primary Examiner*—Maureen M Wallenhorst
(74) *Attorney, Agent, or Firm*—Law Offices of Natan Epstein

(57) ABSTRACT

A urine sample is taken by providing to the person a container having a removable cap with an initially unbroken elastomeric septum puncturable by a blunt tipped pipette and self-resealing following withdrawal of the pipette from the septum. The urine specimen is deposited in the container and the cap replaced. The container with the specimen is conveyed to a laboratory location for analysis where the septum is punctured by manually pressing the blunt tip of a plastic pipette against the septum with sufficient force to puncture through the septum and into the container with the tip. A sample of the urine specimen is drawn into the pipette and the pipette tip withdrawn to allow the septum to self-reseal, such that the urine specimen is sampled for analysis without reopening the container cap following replacement of the cap at the specimen collection site.

6 Claims, 4 Drawing Sheets

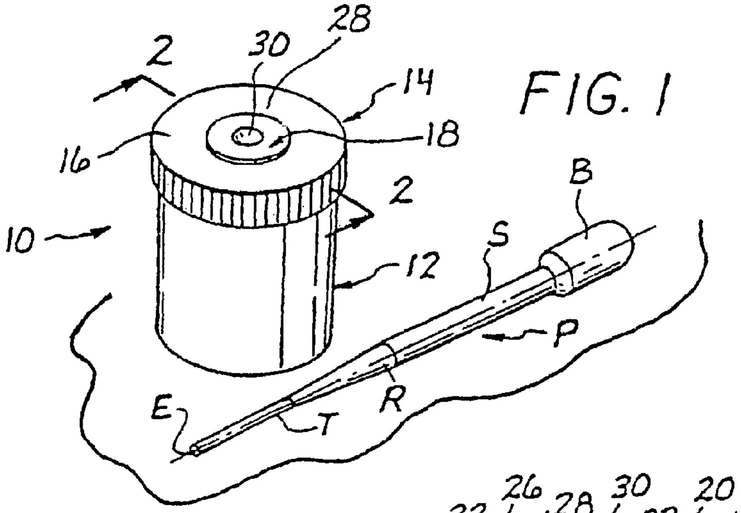
FIG. 1
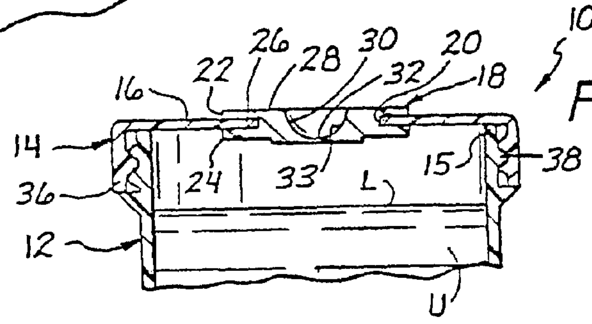
FIG. 2
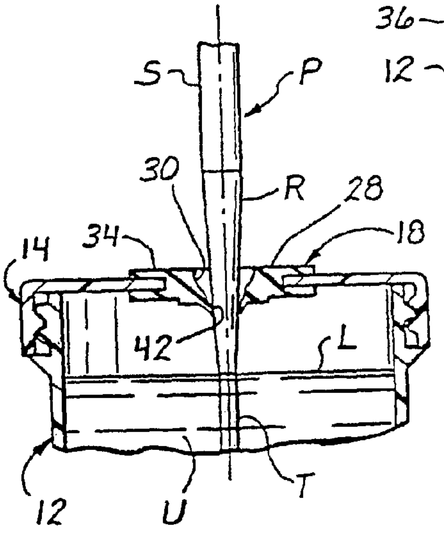
FIG. 3
FIG. 3a
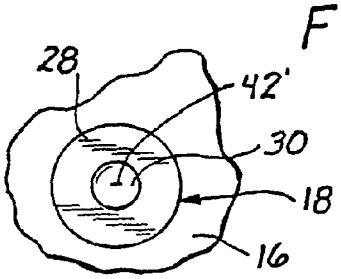
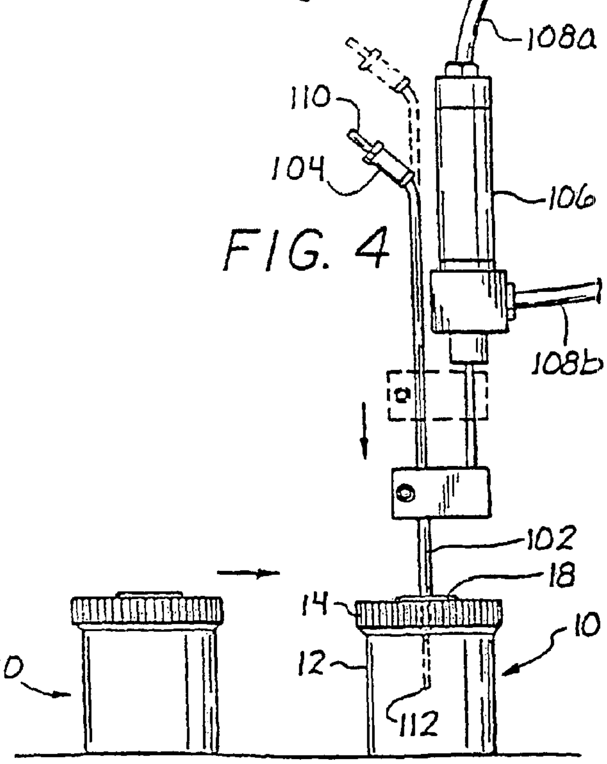
FIG. 4

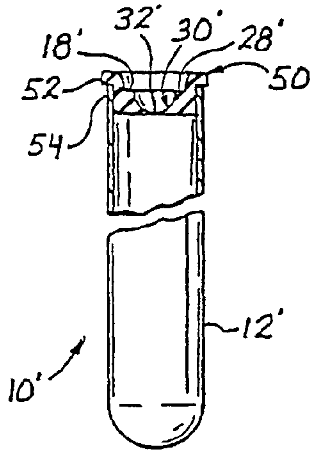
FIG. 5
FIG. 6
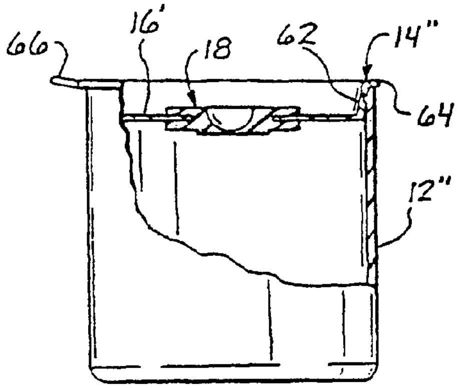
FIG. 7
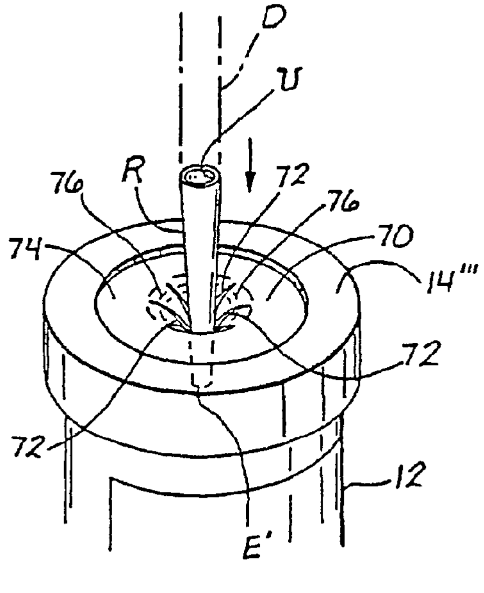
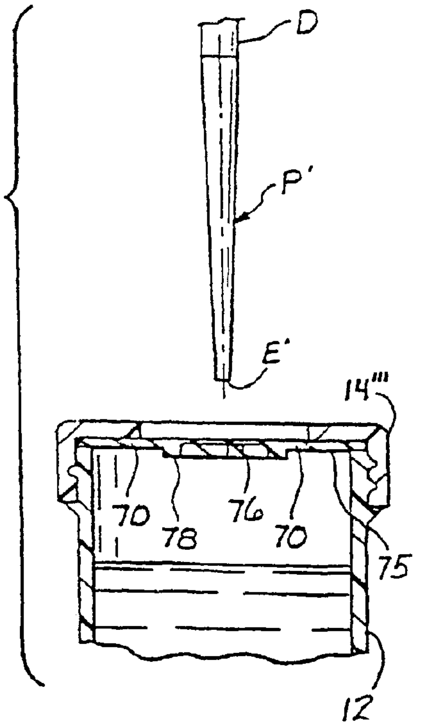
FIG. 8

Fig. 12.
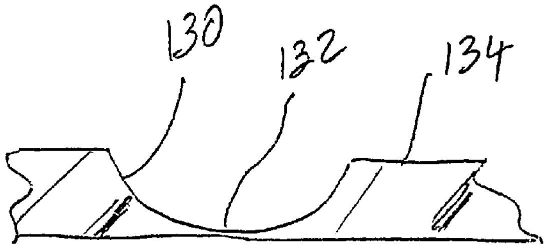
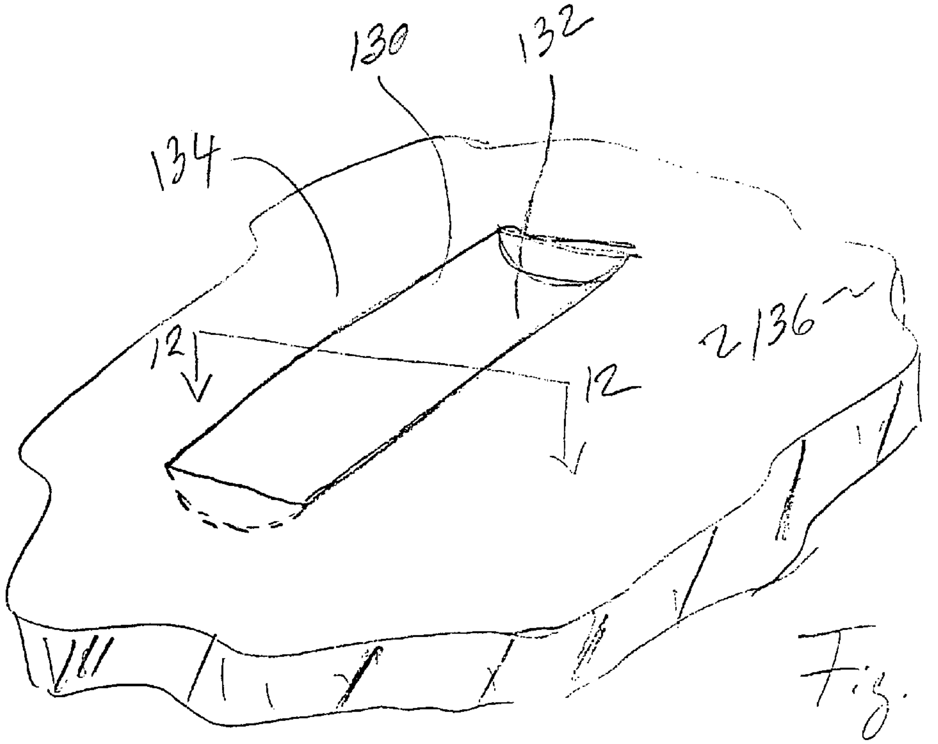
Fig. 11.

SELF RESEALING ELASTOMERIC CLOSURE

This is a continuation of Ser. No. 10/059,998 filed Jan. 28, 2002, now U.S. Pat. No. 6,752,965, issued on Jun. 22, 2004, which is a continuation-in-part of Ser. No. 09/396,706, filed Sep. 15, 1999, now U.S. Pat. No. 6,361,744, issued on Mar. 26, 2002, which is a continuation-in-part of Ser. No. 09/036,578 now U.S. Pat. No. 6,030,582, filed Mar. 6, 1998, issued on Feb. 29, 2000.

BACKGROUND OF THE INVENTION

1. Field of the Invention

This invention relates to the field of self resealable container closures and particularly concerns a closure or cap which is self-resealing after perforation with a blunt tipped implement such as a laboratory pipette. The invention also concerns improvements in clinical laboratory practices resulting from use of the self resealing container closure in specimen containers used in the collection and handling of medical specimens such as urine specimens.

2. State of the Prior Art

Many vials and containers are available with closures, such as a septum of elastomeric material, which are penetrable by a sharp pointed metal needle such as a hypodermic needle, and which maintain a good seal after being pierced by the needle. Those closures, however, cannot be penetrated with relatively blunt tip ends such as those found on liquid transfer pipettes commonly used in clinical laboratories for transferring specimen liquids such as blood and urine.

No containers are known having an elastomeric septum puncturable by such implements and which is also self-resealing following such puncture in order to restore a sufficiently effective liquid tight seal for safe handling and storage of the remaining specimen material at the clinical laboratory location.

Blood and urine specimens are collected routinely during medical examinations in both outpatient and clinical settings. The individual specimens once collected at the direction of an attending physician is forwarded to a clinical laboratory location which typically is remote from the specimen collection site.

In a typical urine collection procedure, a specimen container is handed to the patient, who then deposits the specimen in privacy. The container vessel may have a screw-on or snap-on cap which may be replaced by the patient after depositing the specimen. The closed container is then handed to a nurse or other medical attendant, who arranges for transfer of the container to the laboratory location. The laboratory location may be in the same building or complex, in the case of a hospital, or may be at a considerable distance across town or even in another city if the specimen was taken at a physician's private office. In either case, some transport of the specimen container is involved, during which it is important to safeguard the specimen against contamination while avoiding any leakage of the specimen liquid from the container. Both these objectives call for a reliable liquid tight seal between the cap and the container.

When received at the clinical location, the specimen container is transferred to a laboratory technician who draws a sample from the clinical specimen in the container. The sample is then subjected to the analytical procedure requested by the attending physician.

The current practice in clinical laboratories is to draw the analytical sample from the specimen container by means of a single use disposable plastic pipette. This pipette is similar to an eye dropper in that it includes a squeeze bulb attached to the upper end of a holding tube, the lower end of which is drawn out to form an elongated tip portion of reduced diameter terminating in an open tip end. The laboratory technician opens the container by manually unscrewing or otherwise removing the container cap, introduces the tip of the pipette into the open container vessel, immerses the tip in the liquid specimen, and aspirates the analytical sample into the holding tube by squeezing and releasing the bulb of the pipette.

The plastic transfer pipettes normally used for this purpose are intended to be used only once and discarded after that single use to prevent cross contamination of successive specimens processed in the laboratory. In the interest of economy, these pipettes are therefore molded in a relatively flexible, soft thermoplastic material which permits the squeeze bulb to be formed integrally with the holding tube and the drawn out tip. The result is that the tip portion of the pipette is rather flexible and is readily bent sideways. A typical transfer pipette of this type has a holding tube which is 2.5" in length by approximately ¼" in diameter, a tapering portion approximately 1 and ⅛" in length at the lower end of the holding tube, terminating in a tip portion 1" in length and approximately ⅛" in outside diameter. The tip opening is approximately circular and the tip end is cut square or perpendicular to the longitudinal dimension of the tip portion. At the upper end of the holding tube, the squeeze bulb is approximately 1.25" in length and about ½" in diameter. The holding tube portion of the pipette can be squeezed flat between two fingers with little effort, and the thinner tip section can be bent sideways very easily, tending to return to a generally straight original condition when released. The wall of the tip portion at the tip opening is about 1/32" in thickness. If the pipette is grasped at its mid-portion, along the holding tube portion, and the tip end is pressed against a hard surface, the tip portion of the pipette bends sideways with the application of little manual force applied axially along the pipette and normally to the hard surface. These single use soft plastic transfer pipettes are widely used in clinical laboratories and have proven adequate in regard to economics and functionality for their intended purpose.

Some clinical laboratories prefer to use pipetters with disposable tips. Pipetters are syringe-like devices with a plunger which, when depressed, draws a measured, preset amount of fluid into the barrel to the pipetter through a plastic tip fitted onto the end of the pipetters draw tube. The tip can be ejected from the pipetters by pressing a handle or lever provided for this purpose, without the user touching the tip. A new plastic tip is then fitted onto the pipetter for drawing the next sample, and avoid cross-contamination between successive samples. Such pipetters are widely used in laboratories and are available from many different manufacturers. The disposable plastic tips for the pipetters typically are of elongated conical shape, tapering to a circular tip opening. The open tip end is cut across the long axis of the tip to form a blunt tip end which presents the full thickness of the tip wall transversely to that axis. The open tip end diameter may be about 3/32ds of an inch, with a tip opening of about 1/32nd inch. The length of the disposable tip may be about 3⅜ths inch and the top end about 5/16ths inch.

The open tip end of a disposable plastic pipetter tip may be of comparable dimension to the open tip end of a single use disposable sampling pipette, the main difference being that the plastic pipetter tip is relatively stiff and does not flex readily sideways when pressed against a firm surface.

Clinical urine samples are processed and analyzed in large numbers, with larger clinical laboratories handling thousands of such samples every day. Currently, each of the specimen containers must be manually opened by laboratory personnel in order to draw the analytical samples. Opening and recapping of many such containers constitutes a substantial component of the total labor involved in processing the clinical specimens at the laboratory. Also, the repetitive motion involved in unscrewing and replacing the caps has been known to stress the hand and wrist of laboratory personnel to the point of disability. Furthermore, the open specimen containers pose a risk of contamination of specimens, contamination of the laboratory environment, loss of specimens through accidental spillage, and possible infection of personnel.

It is therefore desirable to provide a method for handling and processing urine and other liquid medical specimens which eliminates the need for opening and closing the specimen containers at the clinical laboratory location. It is further desirable to accomplish this objective with a minimum of change and disruption to existing equipment, supplies and procedures to which laboratory personnel have grown accustomed. In particular, it is desirable to provide specimen containers which can be accessed without uncapping with either the disposable plastic pipetter tips or the disposable plastic transfer pipettes currently in widespread use.

Once an analytical sample is drawn from the specimen container, the container with the remaining specimen material is either discarded, if no further need for the material is contemplated, or is stored against the possible need for additional future analysis of the remaining specimen material. For this reason, it is also important that the closed specimen container maintain an effective seal against spillage and significant leakage during such handling and storage even after an initial sample has been taken of the liquid contents.

For these and other reasons, improvement is needed in the specimen containers used for this purpose and in the handling of the clinical urine specimens.

SUMMARY OF THE INVENTION

In response to the aforementioned need, the present invention provides a self resealing perforable closure adaptable to a wide range of containers. The novel closure has particular application in specimen containers for collecting and transporting medical liquid specimens, particularly urine, blood and other clinical specimen fluids. Also disclosed is a method of handling specimens using the improved container.

The improved specimen container has a container vessel with an open container vessel top, and a container cap which can be manually removably engaged to the container vessel for making a liquid tight closure with the vessel top. The container cap has a septum of elastomeric material selected and configured to be puncturable by the relatively blunt tip of a disposable plastic pipetter tip or by a single use soft plastic laboratory transfer pipette driven with manual force against the septum in order to introduce the tip into the capped container for drawing an analytical sample of the urine specimen. The elastomeric material is further selected and configured to be substantially self-resealing against significant leakage of specimen liquid through the septum following withdrawal of the pipette tip from the punctured septum.

That is, the elastomeric septum of this invention has two main characteristics. One chief characteristic of the elastomeric septum according to this invention is that it is puncturable by tubular sampling implements having relatively blunt open tip ends which cannot pierce the relatively hard rubber septa typically used in the caps of drug vials and on the sterile glass tubes commonly used for drawing clinical blood samples. These hard rubber septa can be pierced with sharp metallic needles, but cannot be punctured with any known plastic tubular sampling implement and in particular cannot be punctured by a disposable plastic pipetter tip nor a disposable soft plastic transfer pipette. In general, the septum of this invention is puncturable by relatively wide diameter liquid sampling instruments, of plastic, metal or other material, which do not have a sharp needle point at the tip of the type used for piercing conventional harder rubber septa. By blunt tip end is meant any tip end which is not cut at a slant to form a sharp needle point.

A second chief characteristic of the novel septum is the septum's ability to substantially self-reseal following puncture by such a relatively blunt and relatively wide diameter tubular sampling implement, to a resealed condition where the septum is substantially closed against spillage of the container's contents during normal handling of the specimen container on the laboratory premises following puncture of the septum by a sampling implement.

The container cap may be entirely made of the same resilient material which defines the septum, or the cap may have a rim of relatively hard material with the septum of puncturable resilient material supported in an opening in the cap. The container cap may be configured to make a snap fit or press fit with the container top, or alternatively may be threaded for screwing on the container vessel top, in either case making a liquid tight seal with the container vessel.

In a presently preferred configuration of the self resealing closure the resilient material of the puncturable septum is configured so as to define a relatively thick peripheral portion about a central portion of reduced thickness. The thicker peripheral portion is not readily puncturable by the transfer pipette tip while the portion of reduced thickness can be readily punctured with that tip by application of little or moderate manual force to the sampling implement.

The central portion of reduced thickness of the septum may be a dimpled portion gradually diminishing in thickness from the relatively thick peripheral portion to a minimum thickness. Alternatively, one or more slits may be cut partially through the thickness of the septum in order to define a weakened portion, effectively of reduced thickness which is more readily puncturable by the blunt ended tip of the sampling implement than a remaining relatively thick portion of the septum.

A presently preferred elastomer material for the manufacture of the self-reclosing seal of this invention is a proprietary material commercially available as J-1, and described by its vendor as a mixture of hydrogenated isoprene-propylene. The perforable septa of the self-resealing closures are made by injection molding in conventional machines. This invention is not however restricted to this one material as other elastomers may also be found suitable for purposes of this invention.

This invention also includes an improved method of processing clinical laboratory samples including blood and urine samples, using specimen containers equipped with the self-resealing closure also disclosed herein.

The improved method of collecting and processing urine specimens includes the steps of providing to the specimen donor an improved specimen container according to this invention. The specimen donor deposits a urine specimen in the open specimen container, and the container is closed by replacing the container cap to make a liquid tight seal with the container vessel top. The sealed container with the urine specimen is then conveyed to the laboratory location. There, the tip of a relatively blunt generally tubular sampling implement such as a disposable plastic tip for a pipetter or the tip of a single use soft plastic transfer pipette, is manually pressed against the septum with sufficient force to puncture and penetrate through the septum into the container. An analytical sample of the urine specimen is then drawn into the sampling implement, and the tip of the implement is withdrawn to allow the septum to substantially reseal itself. According to this method, the urine specimen is sampled for analysis without opening the closed specimen container once it has been closed at the specimen collection site. After taking of the analytical sample, the specimen container with the remaining urine specimen material may be placed in cold storage against possible future need for additional analytical samples of the same clinical specimen, or discarded if no further analysis is anticipated.

It should be understood that the advantages described above are not limited to the processing of urine specimens and comparable advantages may be realized by depositing and conveying other biological, medical or otherwise hazardous materials in container equipped with the self-resealing closure of this invention.

The improved specimen container of this invention can also be used advantageously with auto sampling analyzers of the type having one or more metal pipettes for dipping into a liquid specimen in a specimen container, aspirating an analytical sample of the liquid specimen, and transferring the aspirated sample for analysis. In such case, the closed specimen container containing the clinical specimen is submitted to the analyzer for automated puncturing of the septum in the specimen container by the metal pipette without first removing the container cap. After the analyzer automatically withdraws the pipette from the septum, the elastomer material of the septum substantially self-reseals the puncture. As a result, analytical sampling of the clinical specimen is performed by the automated machine without removing the container top from the container vessel. These and other advantages, improvements and features will be better understood by reference to the following detailed description of the preferred embodiments taken in conjunction with the accompanying drawings.

BRIEF DESCRIPTION OF THE DRAWINGS

FIG. 1 illustrates in perspective view a specimen container improved according to this invention and a typical single-use plastic transfer pipette of the type suitable for sampling the contents of the container through the puncturable septum;

FIG. 2 is a cross-sectional view taken along line 2-2 in FIG. 1 depicting the puncturable septum in the container cap;

FIG. 3 is a view as in FIG. 2 showing the septum punctured by the plastic transfer pipette of FIG. 1;

FIG. 3*a* is a top plan view of the central area of the container cap of FIG. 1 illustrating the torn but reclosed center of the elastomeric septum following withdrawal of the plastic transfer pipette;

FIG. 4 illustrates a metal pipette of a typical auto-sampling analyzer driven through the septum of the improved specimen container of FIGS. 1 and 2 for drawing an analytical sample of the clinical specimen;

FIG. 5 is a side view partly in section of a vial with an elastomeric press-fit closure provided with an integral elastomeric septum according to this invention;

FIG. 6 is a side view partly in section of a specimen container with a press-fit container cap, the cap having an elastomeric septum as in FIGS. 2 and 3;

FIG. 7 is a top side perspective of a specimen container having a cap with an elastomeric septum punctured by a transfer pipette, the septum having a puncture area defined by cuts in the septum material to define a weakened area puncturable by the transfer pipette; and FIG. 8 is a cross sectional view of the container cap of FIG. 7 showing the septum before puncturing with the transfer pipette.

FIG. 11 is a perspective view of an alternate form of the self resealing elastomeric septum according to this invention, which has an elongated, rectangular depression and a linear rather than radial area of minimum thickness; and FIG. 12 is a cross section taken along line 12-12 in FIG. 11.

DETAILED DESCRIPTION OF THE PREFERRED EMBODIMENTS

Figure 9:
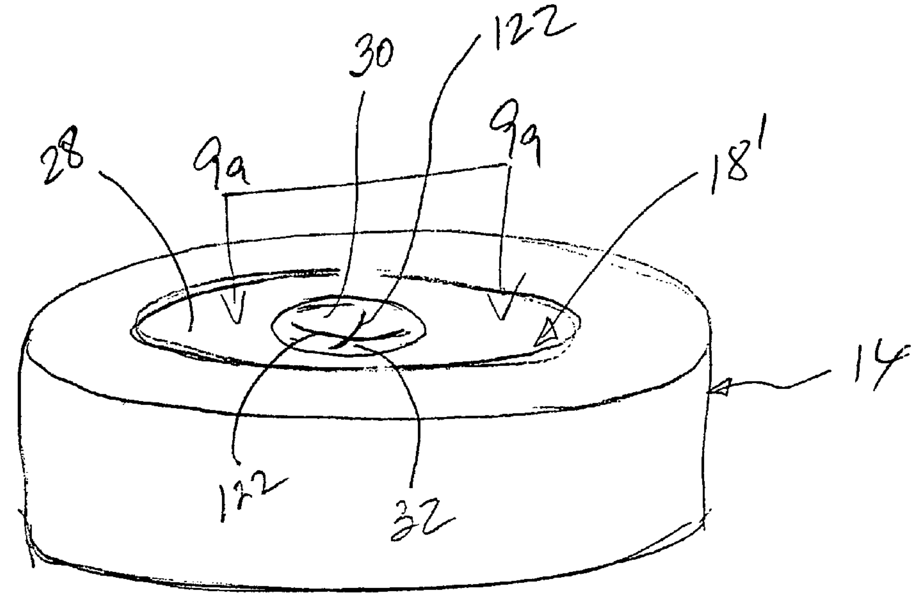
FIG. 9 is a perspective top-side view of a container cap provided with a self resealing pre-cut elastomeric septum according to this invention.

With reference to the accompanying drawings in which like elements are designated by like numerals, FIG. 1 shows an improved specimen container generally designated by the numeral 10. The specimen container, which is cylindrical for purposes of example only, includes a cylindrical container vessel 12 and a container cap 14 fitted to the open top 15 of the vessel 12 to make a liquid-tight seal with the container vessel, as better seen in FIG. 2. The cap 14 has a radially outer or peripheral rim portion 16 made of a relatively hard material, for example a relatively stiff thermoplastic such as polyethylene, and a centrally disposed septum 18. The peripheral portion of cap 14 also includes an annular dependent wall 36 interiorly threaded for screwing onto a mating exterior thread 38 just below the open top 15 of the vessel. The threading is such that a liquid-tight seal can be achieved by tightening the cap against the vessel top. Generally, the choice of material for the container vessel 14 and peripheral cap portion 16 is not critical, and both may be of any suitable injection molded thermoplastic.

The specimen container 10 is intended for use in conjunction with commercially available sampling or transfer pipettes such as the pipette P in FIG. 1. Pipette P has a midportion consisting of holding tube S, a squeeze bulb B integrally formed with the upper end of the holding tube S, a tapering transition R extending from the lower end of the holding tube S and a tip portion T of relatively small, approximately constant diameter. The tip portion T terminates in a tip end E which is square-cut with the longitudinal dimension of the tip portion, i.e., is not cut at an angle to define a needle point. The entire pipette is integrally molded in one piece together with the squeeze bulb attached to the holding tube. The need to provide flexible walls on the bulb to permit squeezing also results in a relatively flexible holding tube S. The smaller diameter tip portion T is particularly flexible and bends sideways with little force, for example, when the tip end E is pressed against an unyielding surface. Single-use soft-plastic transfer pipettes of this type are widely used in clinical laboratories and commercially available from many manufacturers, such as Corning Samco, located at 1050 Arroyo Ave., San Fernando, Calif. 91340. The transfer pipettes from this and other sources are available in a range of overall and fluid capacities, and with varying lengths of the small diameter tip section T. For purposes of this invention, pipettes having relatively long tip sections T are preferred since it is desirable for the tip end E to reach well into the specimen container after puncturing the septum, so that most of the clinical specimen volume can be drawn, if necessary. Such extended small diameter tips are quite flexible and are sold with blunt, square cut tip ends. These pipette tips were never intended for puncturing a container cap, and prior to this invention have never been used in that manner. As mentioned earlier, the accepted procedure in clinical laboratories is to manually open the urine specimen containers, draw the analytical sample with the pipette, and then manually recap the container. It is therefore an important feature of the specimen container 10 with puncturable septum according to this invention that use is made of the existing single-use soft plastic pipettes, which are well known to the clinical laboratories and which are widely available from many established vendors. Furthermore, the same pipettes P may be used with clinical specimens handled in the conventional manner, i.e., by opening and closing the specimen containers, as well as with the novel specimen container disclosed herein. The ability to use the same pipettes for both methods simplifies operation of the clinical laboratory, if specimens are received in mixed containers, some requiring opening and others puncturable with the pipette. It also enables implementation of the improved specimen containers by a laboratory with a minimum of inconvenience and expense, while deriving immediate benefit in reduced labor cost and diminished risk of contamination.

The septum 18 is made of an elastomeric material and is supported in a central hole 20 defined in the cap 14. For example, an interference fit is formed by radially overlapping exterior and interior septum portions 22, 24 between which is captive the inner cap edge 26. The septum 18 in its presently preferred form has a peripheral portion 28 which is relatively thick, and a central portion of reduced thickness which in the illustrated example is a generally spherical dimple or dished area 30 in the upper or exterior surface 34 of the septum. The thickness of the septum reaches a minimum at and near the center 32 of the dimple 30. The width or radius of this central dimple area 32 having the minimum thickness is approximately equal or slightly greater than the outside diameter of the tip E of transfer pipette P to be inserted through the septum 18. That is, the area of the dimple which is readily perforable by the pipette tip end is not much wider that the outside diameter of the tip end, and is surrounded by a transitional dimple area 33 of rapidly increasing thickness. The dimple 30 is itself surrounded by the peripheral portion 28 of the septum which is of much greater thickness than the perforable area 32 of the dimple and which cannot be perforated by the pipette tip E in any practical manner.

The presently preferred elastomer material for the manufacture of this invention is a proprietary composition known in the industry as J-1 and commercially available from JS Plastics, 1899 High Grove Lane, Naperville, Ill. 60540. The vendor as a proprietary mixture of hydrogenated isoprene-propylene describes the material. Insofar as known to this applicant the actual formulation of the J-1 composition is held in confidence by this vendor and is not available to the public.

Manufacture of the elastomeric seal is by injection molding using a cavity mold in a conventional injection molding machine. The injection molding process is conventional and does not require detailed description here. Briefly, the granulated plastic material is placed in the hopper of the injection molding machine. An oiled clamp ram rotates the platen, closing the mold. The pressure behind the clamp ram builds up, developing enough force to keep the mold closed during the injection cycle. The J-1 elastomer material is melted by the turning of the screw, which converts mechanical energy into heat. Additional heat is added by heating bands provided on the plasticizing cylinder (extruder barrel). As the J-1 material melts, it moves forward along the screw flights towards the front end of the screw. Injection cylinders on the molding machine bring the screw forward, injecting material into the mold cavity.

Injection pressure is maintained for a predetermined length of time which in part is dependent on the machine being used, the dimensions of the mold cavity, and other factors which will be apparent and understood by those having ordinary skill in the injection molding of plastic materials. The temperature of the J-1 elastomer in the mold during this predetermined length of time is maintained within a range of approximately 260 degrees to 340 degrees Fahrenheit. The injection molding procedure just described is substantially the same for elastomeric seals of different dimensions.

Of essence to this invention is that the elastomer material possess good shape-memory characteristics for returning to a closed substantially liquid tight condition after being perforated by a transfer pipette or similar implements in the manner described herein. The J-1 material has shown satisfactory shape-memory characteristics and is at this time the preferred material for the practice of this invention. It should be understood, however, that this invention is not limited to a particular plastic material, as there exist a great many formulations and compositions of plastic materials suitable for injection molding or equivalent manufacturing processes, and other materials may also be found suitable.

If the septum is made with the presently preferred elastomer material, the perforable area of minimum thickness 32 initially tends to stretch substantially as the pipette tip E is pressed against it, eventually reaches the limit of its elasticity and breaks to pass the pipette tip portion T through a tear 42 in the septum 18, as shown in FIG. 3. The size or extent of the resulting tear in the elastomer material of perforable portion 32 is limited by the increased thickness of the immediately surrounding elastomer in the transitional zone 33 of the dimple 30, which instead of tearing distends elastically, when forced to admit and accommodate the increased diameter of the tapering portion R of the pipette or even the diameter of the holding tube S. This may become necessary if the tip end E cannot reach the level L of the specimen fluid U in the container vessel 12.

In the restored or resealed condition the area of minimum thickness 32 has a small permanent tear 42', depicted in FIG. 3*a*, through its thin elastomeric sheet, but the edges of the tear 42' are brought and held together to essentially reclose the septum against significant fluid flow and leakage. The small size of the tear 42', the tendency of the septum to close the tear by bringing and holding together the edges of the tear, the relatively small liquid volume of the typical medical specimen, and the natural surface tension of the liquid, all cooperate towards containment of the liquid by the torn septum, in effect restoring the septum to a substantially resealed condition sufficient to contain liquid flow through the septum during normal handling of the specimen container on the premises of the laboratory. When inclined sideways, or even inverted, the torn septum will typically contain the liquid against significant, if any, spillage from the capped specimen container 10.

Generally, the septum is made substantially self-resealing by keeping small the area penetrable by the pipette tip end E and surrounding that area with thicker elastomeric septum material which is not readily puncturable by the pipette tip end E but which contributes sufficient resiliency for reclosing and essentially resealing the tear 42' after the pipette P has been withdrawn from the septum. It should be appreciated that this septum configuration differs from conventional thick septa provided in drug vials and the like, which are intended to be penetrated with the sharp point of a metal needle. Such conventional septa cannot be penetrated by the blunt tip of plastic sampling pipettes. It is only because of the particular selection of septum material and the design and construction of the septum structure specifically for this purpose that penetration of a septum with the pipette tip E becomes possible, which is a previously unknown application and use of such sampling pipettes and similar sampling implements.

In a presently preferred embodiment of this invention, a 100 milliliter urine specimen container having a container portion 12 with an inside diameter of about 2 inches and a correspondingly sized cap 14, has a septum 18 with an overall diameter one inch in diameter, including the overlapping portions 22, 24. The septum is supported in a hole 20 which is about ⅝ths of an inch in diameter, such that the thicker peripheral portion 28 of the septum has a similar diameter and is contained in this hole. Dimple 30 is a depression approximately 5/16ths (five sixteenths) of an inch in diameter and approximately hemispherical shape with a ¼ inch radius of curvature of the hemispherical surface. It will be appreciated that the dimple 30 is surrounded by a relatively narrow ring of elastomeric material which itself is radially contained by the circular edge of the hole 20 in the cap 14. This radial containment of the elastomeric material surrounding the dimple contributes to the inward resilience of this material following radial distention caused by insertion of the pipette and aids in restoration of the torn septum to a substantially closed condition.

The thickness of the peripheral portion surrounding the dimple 30 is approximately 3/16ths (three sixteenths) of an inch while the minimum thickness achieved at the perforable central area 32 of the dimple is a few thousands of an inch, for example, about 9/1000ths of an inch (0.009 inch).

The collection and handling of a clinical urine specimen using the specimen container of this invention may be as follows: a container 10 appropriately labeled is handed to a specimen donor at a specimen collection site, e.g. a patient at a doctor's office, who deposits a urine specimen in the open container portion 12. Normally, the donor will also replace the container cap 14 to close the container 10; otherwise the cap is replaced by the attending staff. The attending medical staff then forwards the container 10 with the clinical specimen to a laboratory location for analysis. Receipt of the container 10 is recorded and the container is passed on to laboratory personnel for processing. The laboratory technician takes a single-use soft plastic sampling pipette P and holding the tip portion T between two fingers, e.g. thumb and index finger, presses the tip end E against the puncturable area 32 of the septum 18 until the septum ruptures and the tip section T can be advanced through the resulting hole until the tip end E is immersed in the specimen liquid U. While pressing the tip section against the septum the two fingers can be placed as close to the tip end E as needed to avoid significant lateral bending of the tip portion T under pressure, although a comfortable holding position at about the middle of the tip portion is usually adequate for this purpose. The pipette bulb B is then squeezed to aspirate and draw a sufficient analytical sample into the holding tube S, and the pipette P is withdrawn by pulling the tip end E out of the container 12 and from the hole 42 in the septum, to allow the elastomer making up the septum to return to its initial undistended condition and thereby substantially reseal by closing the hole 42. The quality of the resulting seal may not be equal to that of the original unperforated septum, for such purposes as shipping the specimen container by mail or other common carrier. However, for purposes of storing the specimen container 10 with the remaining specimen liquid on site at the laboratory location, the restored seal has been found to be adequate even after another two or three subsequent insertions of a sampling pipette P through the existing puncture in the perforated septum. However, after the puncture is distended a number of times, typically three or four times, the septum elastomer tends to lose resilience and the quality of the seal effected by the perforated septum deteriorates. The degree of deterioration depends in part on the extent of stretching of the septum material by the pipette, so that better resealing capability may be expected if only the tip portion T is pushed through the septum, while the resealing capability is diminished if the larger diameter tapering section R or the holding tube S are forced through the punctured septum. Still, since only a very small number of repeat samplings of a given urine specimen container are normally needed, such a short service life is acceptable and adequate. In any event, the object of the resealed septum is to substantially prevent spillage of the container contents during normal handling of the container 10 on the laboratory premises, and to retain this capability while drawing a small number of successive analytical samples from the container without removing the container cap.

Yet a further advantage of the improved specimen container 10 is that the same container can be processed in auto-sampling urine analyzers, which are a recent innovation just now coming into use in clinical laboratories. This equipment is costly and it is expected that in the near future only laboratories with highest volume will make such investment. Smaller laboratories will most likely continue for some time with manual processing of urine specimens as described above. Given this scenario, manufacturers of auto-sampling urine analyzers have found it commercially expedient to design their machines for compatibility with urine specimen containers in current use. As presently configured, such urine analyzers have a robotic mechanism designed to open the specimen container by removing its cap and reclosing the container after the sample has been drawn, in effect emulating the manual procedure practiced in clinical laboratories lacking automated equipment. A typical pipette assembly of an auto-sampling clinical analyzer is shown in FIG. 4. A thin metal tube 102 serves as a sampling pipette for drawing the analytical sample from a specimen container 10 into a small reservoir 104. The top end 110 of the pipette is connected to a vacuum line (not shown) for aspirating the analytical sample from the container 10. The lower end of the pipette is not tapered to a needle point; rather, it is cut transversely at a right angle to the length of the pipette tube.

Automated processing of urine samples in such analyzers using the standard, relatively blunt ended metal pipette 102 can be considerably expedited by substituting the improved specimen container 10 for conventional urine specimen containers which lack a septum. The mechanism (not shown in the drawings) which removes and replaces the specimen container caps can be disabled in an existing analyzer, allowing the machine to present the specimen container 10 to the metal pipette with its cap 14 in place. In existing analyzers the metal pipette is lowered into the specimen container by a pneumatic or hydraulic actuator 106, from the phantom lined to the solid lined position in FIG. 4. Actuator 106 normally has sufficient driving force to puncture the minimum thickness at the center 32 of septum 18 of the novel container 10. Use of the novel specimen container 10 consequently shortens the machine cycle of conventional auto-samplers by obviating the need for both removal and replacement of the container cap 14.

Another difficulty addressed by the present invention is the hazard of contamination and infection resulting from the mechanical handling of open specimen vials and bottles in automated analyzer equipment. In high speed auto-samplers specimen containers are subject to abrupt start/stop acceleration, shock and vibration as the specimens move through the machinery and container caps are rapidly removed and replaced by robotic machinery. Such handling often results in sloshing, splashing and spillage of biologically hazardous specimen fluids onto the machinery and its surroundings, requiring frequent, tedious and costly cleaning. Cross-contamination of neighboring open specimen containers in the auto-sampler's specimen queue is also possible, introducing a source of possible error with potentially grave consequences to the patient.

Use of the perforable self-resealing closures according to this invention substantially reduces or eliminates this problem in that the specimen containers remain covered at all times during transit through the auto-sampler. The result is a greatly enhanced level of environmental cleanliness and hygiene around the auto-sampler equipment and improved reliability of analytical results.

The containers used for urine specimens, particularly where the urine specimen is to be deposited directly into the container by the specimen donor, have special requirements. The container must have a sufficiently wide mouth opening so that a urine stream can be directed with relative ease, by both male and female donors, into the container. In practice, this calls for a container mouth opening of at least 1.25 inches, and preferably of about two inches or greater in diameter. However, this invention also extends to containers with smaller diameter mouth openings, such as vials and test tubes. FIG. 5 illustrates such an application of this invention in which the peripheral portion 16 of the cap 14 has been eliminated and the entire container cap 50 formed of elastomeric material. In cap 50 the septum is formed integrally with a periphery 28' of the cap, which makes a press fit or otherwise retentively engages the open top 54 of the vial, tube or other narrow mouth container vessel 12". The cap 50 retains the features designated by prime numbers equivalent to elements designated by unprimed numerals in FIGS. 1 through 4, namely a septum 18' with central portion 32' which is readily puncturable by the relatively blunt tip of a single-use soft-plastic laboratory pipette P driven with manual force and surrounded by a peripheral portion 28' not easily puncturable in this manner, the cap 50 being of an elastomeric material selected and configured to be substantially self-resealing following puncture by such a pipette.

It has been found that during urine specimen collection, the specimen donor often fails to tighten the screw-on container cap 14 and this fact may remain unnoticed by the attending medical staff, resulting in leakage of the contents during shipment. This difficulty is considerably diminished by providing a press-fit seal between the container cap 14" and the container vessel 12", such as shown in FIG. 6, particularly if a press-fit closure is provided to ensure positive engagement of the cap. Turning to FIG. 6, the container cap 14" has a raised rim 62 which has an outside diameter sized to make a press-fit with the interior wall surface of the container vessel 12". An annular lip 64 projects radially from the upper edge of the rim 62 and serves to limit how far the cap 14" can be pressed into the container vessel 12". A finger tab 66 extends horizontally from the rim 62 to provide a finger hold when lifting the cap from the container vessel. An interior relatively rigid disk 16' within the rim 62 supports the elastomeric septum 18, which is similar to septum 18 as described in connection with FIGS. 1-3. The press-fit cap 14" more readily shows improper closure than a screw-on cap 14 since the entire circumference of the cap in general and lip 64 in particular is exposed to view. Consequently, improper closure is more easily detected at the specimen collection site before shipment, and can be remedied there to avoid leakage in route. However, the specimen container of this invention is not limited to any particular means of cap engagement, nor to any given size or shape of either the cap or the container vessel.

FIGS. 7 and 8 depict a typical disposable plastic pipetter tip P' used to pierce an alternate elastomeric septum 70, in lieu of the sampling pipette P shown in connection with FIGS. 1 and 3, in order to illustrate the versatility of the specimen container with the novel elastomeric septum. The pipetter tip P' is tubular with a tapering diameter between a relatively wide open upper end U' and an opposite tip end E'. The upper end is sized to make a retentive fit on the lower end of a draw tube D of a conventional pipetter. The tip end E' has a small tip opening through which the liquid sample is drawn up through the tip and into the draw tube D of the pipetter. The open tip end E' is relatively blunt because it is cut perpendicular to the long axis of the tip P' and the generally flat annular end surface of the tip end presents a relatively large cross-sectional area because of the thickness of the plastic tip walls. The transfer pipette and the disposable pipetter tip are illustrative but not exhaustive of the type of sampling implements which can usefully penetrate the elastomeric septum of this invention.

In alternate forms of the invention, the puncturable area of the elastomeric septum may be defined by means other than the dished or dimpled area 30 of FIGS. 1-3. For example, as illustrated in FIGS. 7 and 8, the septum 18 is replaced by an elastomeric septum sheet 70 secured to the underside of cap 14'" and in which are made a number of cuts or slits 72 to locally weaken the septum sheet and render the weakened area puncturable by the tip end E' of a disposable plastic pipetter tip P', while retaining a surrounding septum portion 74 of undiminished thickness and strength which supplies restorative resilience tending to reclose the tear in the septum caused by the perforation. The degree of weakening can be controlled, e.g., by the depth of the cuts 72 into the septum sheet thickness, as shown in FIG. 6. For example, a number of short cuts 72, preferably made on the interior surface 75 of the septum sheet and intersecting at a common point in a star configuration can serve this purpose, in lieu of the dimple 30. The septum sheet is weakest at the intersection of the cuts and ruptures at that point when the tip E' of the pipetter tip P' is pressed against the center of the septum, as illustrated in FIG. 7, to admit the pipetter tip into the container 10 by depressing a ring of pointed leaves 76 defined by the cuts 72 and thereby creating an opening at the center of the leaves. When the pipetter tip is withdrawn from the septum, the pointed leaves 76 tend to return to a planar condition, substantially closing the opening in the septum against significant leakage of liquid. The restorative force of the weakened septum sheet may be enhanced by increasing the thickness of the sheet in the area 78 of the cuts 72, while cuts 72 cut through most of that thickness to sufficiently weaken the septum for perforation. The greater thickness increases the stiffness of the leaves 76 and improves their tendency to return to a planar position after perforation and depression.

Figure 10:
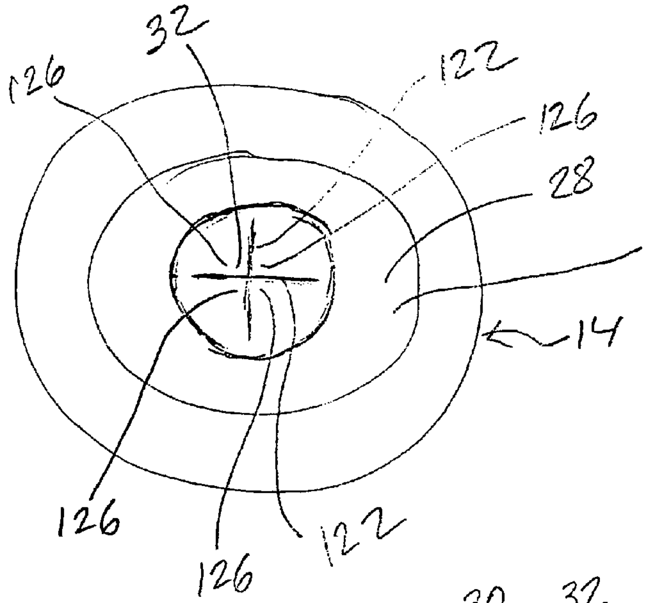
FIG. 10 is a top view of the pre-cut septum of FIG. 9.
Figure 9A:
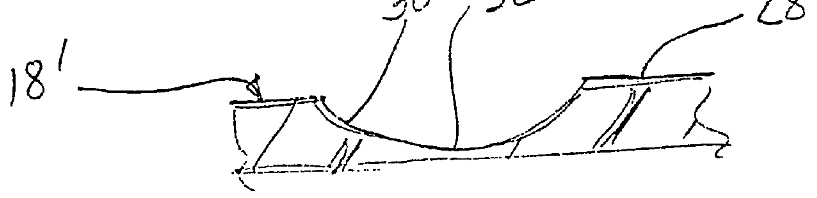
FIG. 9*a* is a fragmentary cross section taken along line 9*a*-9*a* in FIG. 9.

As seen in FIGS. 9, 9*a* and 10 the self-resealing septum 18' is shown pre-cut with two mutually intersecting cuts 122 made through the full thickness of the septum 18'. The cuts 122 intersect in the area of minimum thickness 32, preferably in the approximate center of this area 32. A pre-cut septum 18' may be desirable for applications calling for use of a relatively large diameter pipette, which in turn calls for scaled up septum dimensions with relatively thick septum material surrounding the area of minimum thickness 32. In such case, it may be difficult for an end user to push the blunt ended pipette or similar instrument through an initially unbroken septum so as to perforate or tear the septum. In order to circumvent this inconvenience, a pair of crossed or intersecting cuts 122 are made with a suitable sharp cutting edge. In the case of a circular dished septum depression 30 the cuts 122 are diametric to the circular depression, and the length of each cut 122 is no greater than the diameter of the circular depression 30, that is, the cuts do not extend into the area of much greater thickness surrounding the depression 30. In this regard the cuts 122 are functionally equivalent to a tear 42' such as shown in FIG. 3*a* made in the depression by forcing a blunt tipped implement through the area of minimum thickness, as has been described.

The cross sectional geometry of the septum 18', namely, the increase in thickness of the elastomeric septum material from the area of minimum thickness 32 to the surrounding area of much greater thickness 28, as shown in the drawings and described above, operates to hold together the opposing edges of each of the two cuts 122 in substantially sealing relationship to keep the septum 18' closed against significant or any leakage of liquid therethrough. The four triangular sections or quadrants 126 defined by the intersecting cuts 122 have sufficient elasticity and resilience as to elastically distend to pass an implement such as a pipette tip or other blunt ended implement into a container closed by the septum 18' and to be self-reclosing by restoring and returning opposite edges of the cuts 122 to a substantially contiguous closed condition after withdrawal of the implement. The septum of FIGS. 9, 9*a*, 10 may have dimensions, proportions and other characteristics and features similar to the septum 18 described earlier in this disclosure, except that the septum 18' is pre-cut in order to facilitate passage of large diameter implements in larger versions of the septum. Preferably two intersecting cuts 122 are made in that four quadrants tend to yield more easily under the pressure of an implement than the opposite edges of a single cut 122 or tear 42*a* in cases where the thickness of the septum material impedes ready elastic distention and stretching of the septum material, as in septa of larger dimensions where the thickness of the septum material around the relatively thin are of minimum thickness becomes sufficiently thick as to require more manual force than is convenient and desirable in the application for which the septum is intended. However, a single cut 122 or more than two intersecting cuts 122 may be made in the septum 18' as may be required by the dimensions of the septum, the difficulty in passing the intended implement through the septum, and the acceptable effort in the intended application environment of the septum.

The septum 18 described and illustrated in FIGS. 1-3*a* are shown as circular. This is not an essential requirement of the depression 30 of septum 18 which may take non-circular shapes, such as elongated shapes, polygonal shapes, and square or generally rectangular shapes. In all these variations the increase in thickness of the septum is substantially continuous between the area of minimum thickness of the septum and the much thicker elastomeric material encompassing the depression. This increase in thickness may be radial from the area of minimum thickness even where the perimeter or edge of the depression is other than circular, so that a generally hemispherical curvature of the depression is retained in a depression which is not circular in perimeter shape.

In other variants of the invention, as shown in FIGS. 11 and 12, the area of minimum thickness 132 of the septum depression 130 may have a linear shape and the depression is trough shaped and has, for example, a generally semi-cylindrical shape as seen in cross section in FIG. 12. In this case the increase in thickness from the area of minimum thickness 132 to the encompassing area of much greater thickness 134 occurs along a direction transverse to the length or longitudinal dimension of the depression 130. The increase in thickness preferably occurs along a smooth convex curve as shown in FIG. 12 along a surface 136 of the septum between the minimum thickness 132 and the area of much thicker elastomeric material 134.

It should be appreciated that the portion of minimum thickness defined a weakened area of the septum which is sufficiently weak so that it can be torn and penetrated by the blunt ended instrument such as a laboratory transfer pipette. In particular, the septum geometry described is presently preferred, but other geometries may provide ways of defining a sufficiently weakened area encompassed by a septum portion resistant to both tearing and perforation by the blunt ended implement. For this reason the invention is not limited to the particular geometry described herein. For example, a dished top side of the septum tends to naturally guide the blunt ended implement towards the weakest area of the septum at the bottom of the depression and for that reason may be preferred. However, a visual or other indication may be provided to give such guidance on a top side of the septum if the depression or other septum weakening feature is provided on a bottom side of the septum.

From the foregoing it is seen that the improved specimen container of this invention provides for the first time the capability of processing clinical specimens without opening the container, once it has been closed at the specimen collection location, either manually using the conventional plastic sampling pipettes or in an auto-sampling analyzer using the same container. Thus, the improved specimen container 10 offers significant advantages and greater flexibility over existing specimen containers without sacrificing the conventional features of existing specimen containers. While primarily directed to a present need in the field of clinical analysis, the specimen containers disclosed herein can be used with equal advantage for other materials, medical or non-medical, such as drug vials and chemical reagent bottles. Nor is the usefulness of this invention limited to containment of liquids. For example, hazardous materials in particulate form, susceptible to dispersion as airborne dust, may be more effectively contained in containers equipped with the self-resealing closure of this invention, allowing access to the particulate contents with air aspiration nozzles, for example. Also, the septum 18, 18' of this invention need not be supported in a removable cap of a container, but may also be formed integrally as part of a container wall.

While various embodiments of the invention have been disclosed, described and illustrated for purposes of example and clarity, it should be understood that still other changes, modifications and substitutions to the described embodiments, including other septum designs, arrangements and configurations which however are functionally equivalent to those described above, will be apparent to those having ordinary skill in the art without thereby departing from the scope of this invention as defined in the following claims.

What is claimed is:

1. A method of processing a urine sample deposited by a person at a specimen collecting location and to be analyzed at a laboratory location, comprising the steps of:

providing to the person a container having a container top and a removable cap on said top, said cap having a septum of elastomeric material initially unbroken, said septum having a generally depressed dished portion including an area of minimum thickness, said depressed portion increasing in thickness radially from a minimum thickness to a much thicker elastomeric material encompassing said area of minimum thickness, said depressed portion and said area of minimum thickness being shaped and configured to elastically distend to pass a pipette having a relatively blunt pipette tip with a tip width greater than said minimum thickness of said septum and also greater than a tear in said area of minimum thickness required for passage of said pipette tip through said septum and to be self-reclosing by returning opposite edges of said tear to a substantially contiguous closed condition after withdrawal of said pipette from said septum;

removing the cap from the container top and having the person deposit a urine specimen in the container at the specimen collecting location and then replacing the cap to make a liquid tight seal with said container top;

conveying said container with said urine specimen to the laboratory location;

pressing a tip of said pipette against the septum with sufficient force to puncture through said septum and into the container with said tip;

drawing a sample of the urine specimen into the pipette; and withdrawing said pipette tip to allow said septum to reseal itself;

whereby the urine specimen is sampled for analysis without reopening the container cap following said replacing of the cap at the specimen collection site.

2. The method of claim 1 further comprising the step of placing said container with the remaining urine specimen in cold storage following said withdrawal of said pipette.

3. The method of claim 1 wherein said pipette has a relatively long laterally flexible tip portion extending from a wider intermediate holding tube portion, and further comprising the step of grasping said laterally flexible tip portion with two or more fingers near said relatively blunt pipette tip to minimize lateral flexing of the tip portion during said pressing.

4. The method of claim 1 wherein said minimum thickness is a few thousands of an inch.

5. The method of claim 1 wherein said minimum thickness is approximately nine thousands of an inch.

6. The method of claim 1 wherein said area of minimum thickness has a width approximately equal to said pipette tip width.

* * * * *